Jan. 12, 1943.       T. CAMPBELL       2,308,153
SECURING DEVICE FOR COFFEE PERCOLATOR GLASS TOPS
Filed Jan. 17, 1941

THOMAS CAMPBELL,
INVENTOR.

BY: Julian J. Wittal
his attorney.

Patented Jan. 12, 1943

2,308,153

UNITED STATES PATENT OFFICE 2,308,153

SECURING DEVICE FOR COFFEE PERCOLATOR GLASS TOPS

Thomas Campbell, Jackson Heights, N. Y.

Application January 17, 1941, Serial No. 374,813

3 Claims. (Cl. 53—3)

This invention relates to coffee percolators and has for its main object to provide a novel improved securing means for the glass tops or domes thereof.

Coffee percolators usually are made of sheet metal or other sheet material and have a cover or lid into which is set a top or dome usually of transparent material, like glass, to be able to observe the vapors operating in the percolator, and for ornamental reasons.

These glass tops or domes are usually dropped out of their places when the percolator lid or cover is opened on its hinge and cause various troubles and inconveniences and also damage by being broken or by dropping on some china and similar dishes and breaking them.

Many devices have been proposed, and some of them are used at present, to secure such glass tops in the usually metal cover or lid of the percolator, but all such devices are cumbersome, complicated, inefficient and unreliable, it being a comparatively difficult job to secure such glass tops in a metal cover in a simple and reliable manner and still not interfere with the operation of the percolator.

Another object of my invention therefore is to provide securing means of the type indicated, which will be simple in construction, inexpensive to manufacture and easy to apply or to replace.

Still a further object of my invention is to provide securing means for the domes or tops of coffee percolators which will not interfere with the operation of the percolator or the visibility in said dome, which will not affect the coffee produced or will not be affected by the coffee being prepared, and which will be easily adapted to the percolators now in use.

Other objects of this invention will be apparent as the specification of the same proceeds.

In the drawing, forming a part of this specification and accompanying the same:

Figure 1:
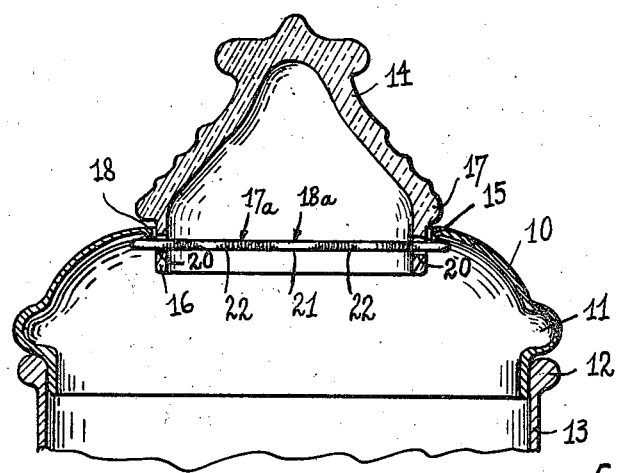
Fig. 1 is a sectional elevation of a cover of a coffee percolator having a glass top or dome set into it.
Figure 3:
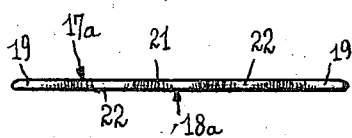
Figs. 3 and 4 are end and side elevations, respectively, of my spring wire securing means.
Figure 2:
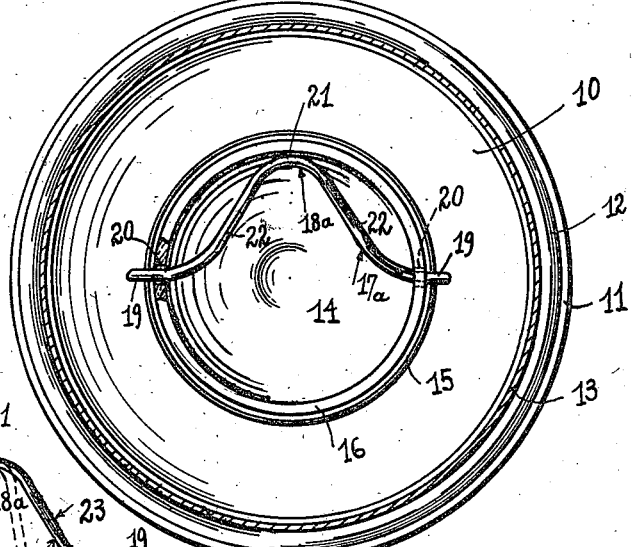
Fig. 2 is a bottom view thereof.

Referring now to the drawing more in detail by characters of reference, the numeral 10 indicates a cover or lid for a coffee percolator of a usual construction, and as it is known, the same preferably is made of sheet metal and hinged on the percolator body, the ledge or shoulder 11 resting on the upper end 12 of the percolator body 13 when the cover or lid 10 is closed thereon.

A glass top or dome 14 is set into an upper central hole or aperture 15 in the cover 10, said top 14 having a downwardly depending circular wall 16 set into the hole or aperture 15 but being somewhat smaller than the same, so as to permit for the difference in the expansion of the top and of the cover under the heat applied to the percolator.

The top or dome 14 usually is of a fanciful and ornamental design and it may have a shoulder or ledge 17 by which it will rest on the marginal portion 18 of the cover around the hole or aperture 15, thereby closing or sealing the top of the percolator.

When the percolator is opened for cleaning or for placing new ground coffee thereinto, the cover or lid 10 will be opened on its hinge, as it is well known, and in such cases, the glass top or dome 14 would drop out from the hole 15, and to prevent this, the mentioned various devices have been proposed, the simplest of which consists in outward projections on the cylindrical lower wall 16 in the glass top and slots or incisions in the marginal portions 18 of the cover 10, so that when it is desired to set the top 14 into the cover it is placed in such a manner that the projections will register with the openings or slots, and after they pass therethrough underneath the marginal portions 18 of the cover, the top 14 will be given a short turn, so that the projections on the wall 16 and the slots in the marginal portions 18 do not register any more. In this manner, the top 14 is supposed to be locked in its place, but it is a well known experience that such locking is very unreliable and the glass tops 14 very often still become freed and will drop out causing the mentioned trouble and damage. The cause of this unreliability of the said most common securing means for the glass domes 14 may be found in the fact that a comparatively large space must be left between the marginal portions 18 of the cover and the glass depending cylindrical wall 16, so that the mentioned projections cannot reach far enough underneath the marginal portions 18, and also in the fact that the dome 14 may easily turn back into a position where the projections and slots register and the dome may drop out.

In my novel securing means for such percolator tops or domes, a suitably bent piece 17a of spring wire is employed, as indicated in the drawing, said wire has an outwardly bulging bent central portion, generally indicated by the numeral 18, and two outer substantially straight ends 19. In two diametrically opposed places, two holes 20 are provided in the depending wall 16 of the top and the securing of it is simply effected by passing the ends 19 of the wire 17a through said holes underneath the marginal portion or ledge 18 of the cover around the hole 15.

It will be obvious that in such a position of the wire 17a, the top 14 is securely and reliably locked into the cover 10, and its dropping out of the same safely prevented.

Figure 4:
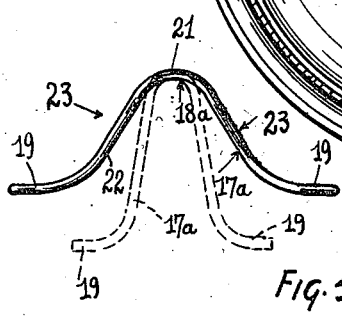

The mentioned bend in the wire 17a may preferably have a central rounded portion 21 and two inclined sides or branches 22, and when it is desired to remove the top from the cover 10, appropriate opposing pressures will be exerted on the branches 22, as indicated by the arrows 23 causing the spring wire 17a to have a sharper bend, its ends 19 nearing each other, as indicated by the dotted lines in Fig. 4 and thereby freeing the ends 19 from underneath the ledge 18 and from the holes 20, so that the top 14 will not be locked to the cover and may easily be removed.

In a similar manner, a new top or cover 14 may be secured in the percolator by the same operations gone through in a reverse manner, that is, first placing the new top into the hole 15, then taking the securing wire 17 and pressing it to a narrower bend, placing its ends into registering relation with the holes 20 and then releasing the pressure and permitting said ends to snap through said holes and underneath the ledge 18.

While I contemplate percolator tops 14 to be manufactured with the holes 20 provided therein, it is obvious that my invention is easily applicable to existing percolator tops, which generally have the construction indicated in Fig. 1, by simply drilling two holes 20 in a low enough position into their depending circular lower walls 16.

It is also obvious that my invention is applicable to practically any percolator tops of different sizes and styles now in use, and being made of any material. The wire 17a will be of suitable thickness, lighter for a smaller percolator and heavier for a larger one, and its material will be of such a character as not to be affected by the coffee and other fumes and vapors and vice versa not to affect them.

I prefer a stainless steel wire, having found the same the best for the purpose, by numerous trials.

When inserting the wire member 17a for locking the device or, vice versa, when releasing the wire member therefrom, said member will preferably be turned transversely to the opening 15 in the cover and into a depending position, its central bend 21 being lowermost, so as to facilitate the exertion of the counter-pressures 23 on its inclined sides 22. When inserting the member 17a into the percolator, and after its ends 19 are locked in the holes 20, the same will be turned into the position shown in the drawing, its plane being parallel to that of the opening 15, its tip 21 being adjacent to the margin of said opening but being spaced apart therefrom sufficiently to allow room for the depending flange or wall 16 of the top or dome 14.

What I claim as new, is:

1. For a percolator having a movable cover with a hole into which is set a separate dome or top resting on said cover, a securing means for the top, including two depending wall portions on the top within said hole, substantially opposite one another, each depending wall having a bore therein, and a wire element bridging the distance between the bores, its ends being passed through said bores and being engaged underneath marginal portions of the cover around said hole, said wire being angularly bent in its center and being resilient so that a pressure on the sides of said center angle will shorten the distance between its ends causing them to leave said marginal portions and said bores and to release the top from said cover while a release of such pressure on said wire will cause said ends to snap back outwardly through said bores and underneath said marginal portions.

2. A releasable securing means for the top of a percolator, said top having a shoulder and said percolator having a movable cover with a central hole on the marginal portions of which said shoulder may rest, said top having a depending wall within and spaced apart from said hole comprising a spring wire member angularly bent at its center portion and having substantially straight ends, bores being provided in said depending wall through which said ends may snap to engage underneath said marginal portion when it is desired to secure the top to said cover, said wire member being adapted to be bent to a narrower configuration by exerting pressure on the sides of said central angular bend, thereby removing its ends from underneath said marginal portion and from said bores.

3. In a releasable securing means for the top of a percolator, as set forth in claim 2, said angular central bend in said wire member being formed in one continuous curve terminating in said straight ends, and said member being adapted to be set transversely to said hole in the cover when it is being inserted into a locking position or being released therefrom, said member, however, being adapted to be turned on its straight termination into parallelism with the plane of said hole, the tip of its central bend then being closely adjacent to said depending wall in the top, and the sides of said bend being spaced apart from the margins of said hole.

THOMAS CAMPBELL.